United States Patent
Koontz, II et al.

(10) Patent No.: US 7,661,759 B2
(45) Date of Patent: Feb. 16, 2010

(54) VEHICLE HEADREST COVER

(75) Inventors: Theodore W. Koontz, II, Miller Place, NY (US); Michael J. Paladino, Manhasset Hills, NY (US)

(73) Assignee: Audiovox Corporation, Hauppauge, NY (US)

( * ) Notice: Subject to any disclaimer, the term of this patent is extended or adjusted under 35 U.S.C. 154(b) by 0 days.

(21) Appl. No.: 11/969,722

(22) Filed: Jan. 4, 2008

(65) Prior Publication Data

US 2008/0284219 A1 Nov. 20, 2008

Related U.S. Application Data

(63) Continuation-in-part of application No. 11/750,468, filed on May 18, 2007.

(51) Int. Cl.
*A61G 15/00* (2006.01)
*A47C 31/00* (2006.01)
(52) U.S. Cl. .................... 297/220; 297/217.4
(58) Field of Classification Search .............. 297/217.4, 297/220, 217.3, 391; 40/792
See application file for complete search history.

(56) References Cited

U.S. PATENT DOCUMENTS

| | | | | |
|---|---|---|---|---|
| 3,879,873 A | * | 4/1975 | Sawyer | 40/792 |
| 4,003,599 A | * | 1/1977 | Takamatsu | 297/220 |
| 5,664,840 A | | 9/1997 | Stenzel | |
| 6,786,547 B1 | | 9/2004 | Chu | |
| 6,883,870 B2 | * | 4/2005 | Jost | 297/391 |
| 7,066,544 B2 | * | 6/2006 | Tseng | 297/391 |
| 7,077,479 B1 | | 7/2006 | Phillips | |
| 7,188,896 B2 | * | 3/2007 | Embach | 297/217.4 |
| 2003/0164630 A1 | | 9/2003 | McKinney | |
| 2004/0182485 A1 | | 9/2004 | Gomes | |
| 2004/0262965 A1 | | 12/2004 | Jost | |
| 2005/0099042 A1 | * | 5/2005 | Vitito | 297/217.3 |

FOREIGN PATENT DOCUMENTS

| | | |
|---|---|---|
| GB | 2283167 | 5/1995 |
| GB | 2408681 | 6/2005 |
| JP | 2001047921 | 1/2002 |
| WO | WO2004024493 | 3/2004 |

OTHER PUBLICATIONS

Written Opinion of the International Searching Authority, dated Feb. 3, 2009, in connection with International Application No. PCT/US09/30044.
International Search Report, dated Feb. 3, 2009, in connection with International Application No. PCT/US09/30044.
European Search Report dated Jul. 21, 2009.

* cited by examiner

*Primary Examiner*—Milton Nelson, Jr.
(74) *Attorney, Agent, or Firm*—F. Chau & Associates, LLC

(57) ABSTRACT

A vehicle headrest cover for covering a vehicle headrest having a display mounted therein includes a material designed to correspond with the shape and dimensions of the vehicle headrest and fit over the vehicle headrest for covering the vehicle headrest. The material has a cut-out in a face thereof which corresponds to the position of the display and also includes a zipper mechanism located on the material of the headrest cover which allows the material of the vehicle headrest cover to be zipped up to cover the vehicle headrest with the vehicle headrest cover or unzipped for removing the headrest cover from the vehicle headrest.

16 Claims, 7 Drawing Sheets

VEHICLE HEADREST COVER

CROSS-REFERENCE TO RELATED APPLICATIONS

This application is a Continuation-In-Part (CIP) of U.S. patent application Ser. No. 11/750,468, filed on May 18, 2007. The disclosure of U.S. patent application Ser. No. 11/750,468 is hereby incorporated by reference herein in its entirety.

BACKGROUND OF THE INVENTION

1. Field of the Invention

The present invention relates a vehicle headrest cover, and more particularly to a vehicle headrest cover for use with a vehicle headrest having a video entertainment system with display mounted therein.

2. Description of the Related Art

As society becomes more mobile and therefore spends a greater amount of time traveling and away from home, the demand for electronic appliances and devices for use outside of the home environment is increasing. For example, video screens have been mounted in the headrests of vehicles, facilitating video entertainment on the road. These video screens mounted in the vehicle headrests are particularly useful for entertaining young children on long trips.

However, there may be certain difficulties associated with providing a vehicle headrest having video screens mounted therein. For one, as the appearance (e.g. interior color and texture) of vehicles differs from one to the next, a manufacturer or retailer may be required to stock several types of vehicle headrests having a video screen mounted therein in order to provide video vehicle headrests which conform to the appearance (e.g. color scheme) of a variety of different types of vehicles. As a result, by having to stock several different vehicle headrests, the manufacturing costs may become significantly high.

Moreover, if the owner of a vehicle wishes to change the look, for example, the color or texture, of his or her vehicle headrest having the video display mounted therein, he or she may be required to replace the entire headrest with another video vehicle headrest to obtain the color, texture and/or design that he or she desires. This can be a costly process which may likely require the assistance of a professional for installing the substitute vehicle headrest.

Thus, there is a need for a relatively low cost effective way of manufacturing vehicle video headrests which conform to the appearance (e.g. color scheme and texture) of a wide variety of different types of vehicles. There is also a need for a relatively low cost product which may be used to modify or alter the appearance of a vehicle video headrest without having to replace the headrest with another one and also which does not require professional installation.

SUMMARY OF THE INVENTION

In accordance with an embodiment of the present invention, a vehicle headrest cover for covering a vehicle headrest having a display mounted therein is provided. The vehicle headrest cover includes a material designed to correspond with the shape and dimensions of the vehicle headrest and fit over the vehicle headrest for covering the vehicle headrest. The material has a cut-out in a face thereof which corresponds to the position of the display.

In some embodiments, the material of the headrest cover may have multiple cut-outs to correspond to the display and control buttons/slots/ports/jacks located separate from the display.

In accordance with an embodiment of the present invention, a vehicle headrest cover package for a vehicle headrest having a display mounted therein is provided. The vehicle headrest cover package includes at least one vehicle headrest cover which includes a material designed to correspond to the shape and dimensions of the vehicle headrest and to fit over the vehicle headrest. The material has an opening in a bottom surface thereof to receive the vehicle headrest therethrough and a cut-out in a front face thereof which corresponds to the position of the display. In addition, the vehicle headrest cover package further includes at least one trim frame for attaching around the display.

In accordance with an exemplary embodiment of the present invention, a vehicle replacement headrest installation kit is provided. The installation kit includes a vehicle replacement headrest having a display mounted therein and a vehicle headrest cover. The vehicle headrest cover includes a material designed to correspond to the shape and dimensions of the vehicle replacement headrest and to fit over the vehicle replacement headrest for covering the vehicle replacement headrest. The material has a cut-out in a face thereof which corresponds to a position of the display mounted in the vehicle replacement headrest.

In accordance with another embodiment of the present invention, a method for distributing vehicle headrest covers and replacement vehicle headrests having a display mounted therein is provided. The method includes stocking a replacement vehicle headrest having a display mounted therein in one color and one material and vehicle headrest covers in a variety of different colors and materials, receiving a purchase order and determining what is included in the purchase order. The method further includes selling at least one of the stocked vehicle headrest covers with or without the stocked replacement vehicle headrest, depending upon what is specified in the purchase order.

In accordance with another embodiment of the present invention, a vehicle headrest cover for covering a vehicle headrest having a display mounted therein is provided. The vehicle headrest cover includes a material designed to correspond with a shape and dimensions of the vehicle headrest and fit over the vehicle headrest for covering the vehicle headrest. The material has a cut-out in a face thereof which corresponds to a position of the display. The vehicle headrest further includes a zipper mechanism located on the material of the headrest cover which allows the material of the vehicle headrest cover to be zipped up to cover the vehicle headrest with the vehicle headrest cover or unzipped for removing the headrest cover from the vehicle headrest.

In accordance with another embodiment of the present invention, a method for installing a vehicle headrest cover on a vehicle headrest is provided. The method includes unzipping a zipper mechanism located on a vehicle headrest cover. The vehicle headrest cover is formed of a material designed to correspond with a shape and dimensions of the vehicle headrest and fit over the vehicle headrest for covering the vehicle headrest, and the material has a cut-out in a face thereof which corresponds to a position of the display. The method further includes placing the unzipped headrest cover over a vehicle headrest through an opening in the unzipped material of the vehicle headrest cover and zipping up the zipper mechanism on the vehicle headrest cover to close the opening in the headrest cover, thereby mounting the vehicle headrest cover in place over the vehicle headrest.

BRIEF DESCRIPTION OF THE DRAWINGS

Exemplary embodiments of the present disclosure will be described below in more detail, with reference to the accompanying drawings, in which.

DETAILED DESCRIPTION OF THE EXEMPLARY EMBODIMENTS OF THE INVENTION

Figure 1:
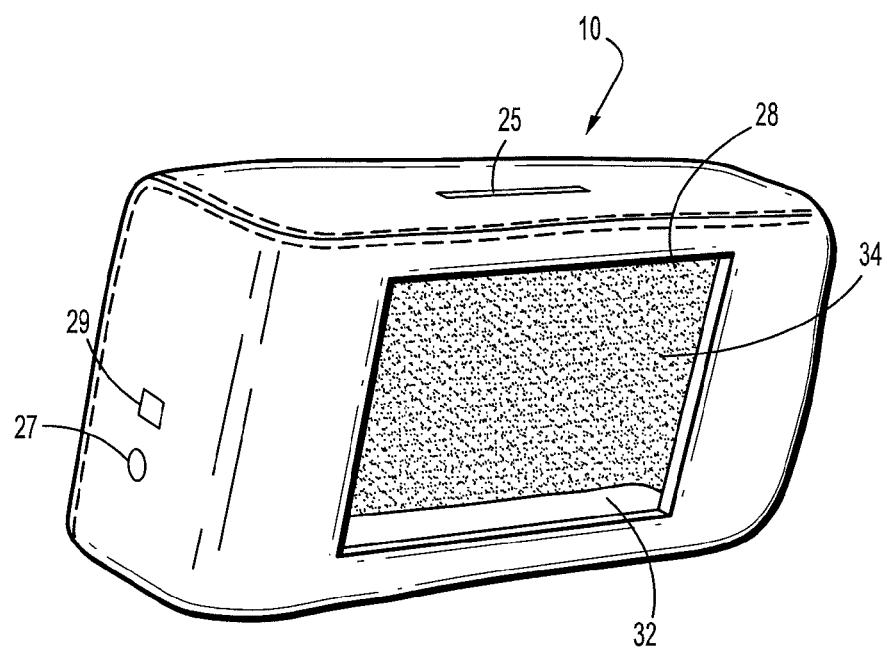
FIG. 1 illustrates a vehicle headrest cover according to an embodiment of the present invention.
Figure 2:
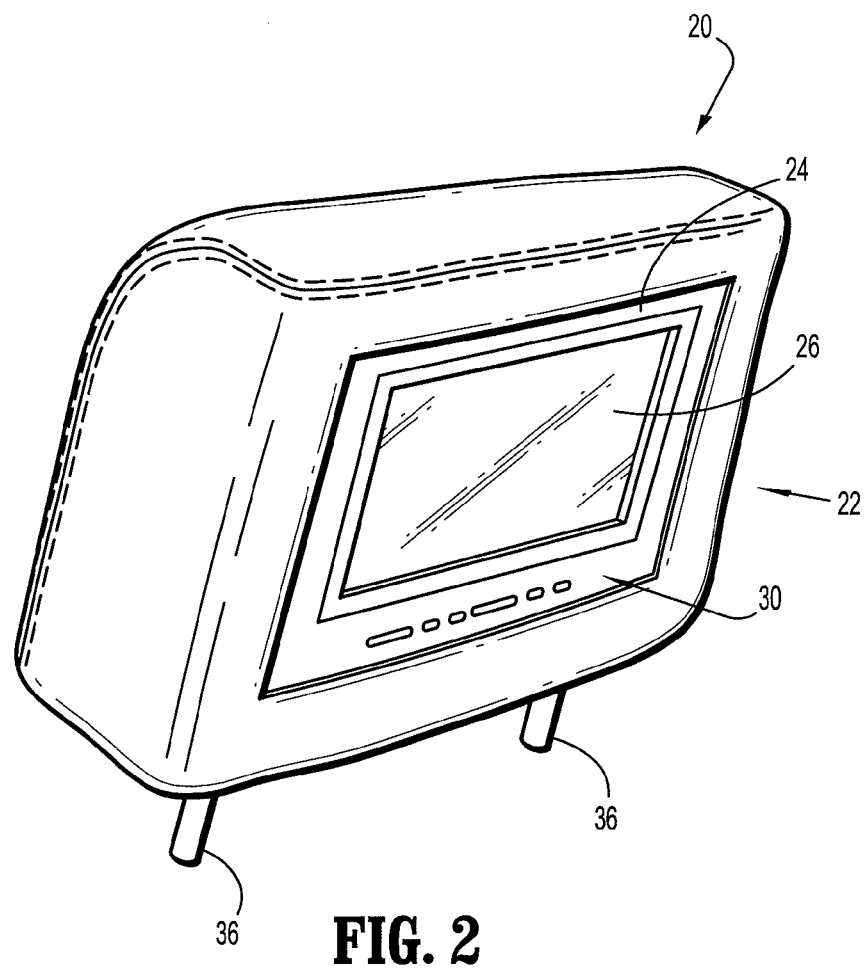
FIG. 2 illustrates a vehicle replacement headrest which may be used with the vehicle headrest cover of FIG. 1.

FIG. 1 illustrates a headrest cover 10 according to an embodiment of the present invention which may be used to cover a vehicle headrest 20 (see FIG. 2) having an entertainment system 22 which includes a media unit 24 (e.g. a digital video disc (DVD) player) and a display 26 (e.g. liquid crystal display (LCD) screen) mounted therein such that the vehicle headrest cover 10 modifies or alters the appearance (e.g. color and/or texture) of the vehicle headrest 20 to, for example, closely match the interior of the vehicle or at least complement a shade of the interior of the vehicle in which the headrest and headrest cover are installed. As will be described in further detail below, the vehicle headrest cover includes a cut-out 28 in a front face thereof for allowing a user to view the display screen 26 mounted in the vehicle headrest 20 through the headrest cover 10 and also allow the user to be able to access the control buttons 30 of the entertainment system 22 through the vehicle headrest cover 10. Moreover, the vehicle headrest cover 10 further includes an opening 32 in a bottom surface thereof leading to a cavity 34 in the interior of the headrest cover 10 which accommodates the vehicle headrest 20 therein.

In the present embodiment, the vehicle headrest 20 which is covered by the vehicle headrest cover 10 is, for example, a vehicle replacement headrest. The term vehicle replacement headrest as used herein is defined as a vehicle headrest having an entertainment system with display mounted therein which has been or will be installed into a vehicle to replace an original or existing headrest which does not have an entertainment system with display mounted therein. These replacement headrests are installed into vehicles to provide video entertainment to the occupants while traveling on the road. It is to be understood that the vehicle headrest cover 10 is not limited to use with vehicle replacement headrests and may be used with any vehicle headrest having an entertainment system.

The media unit 24 of the entertainment system 22 mounted in the replacement headrest 20 may be any type of media source such as, for example, a DVD player, a Compact Disc read only memory (CD-ROM) player, a video game player, a videocassette player, a television tuner, a wireless receiver, an MPEG-1 Audiolayer 3 (MP3) player, a digital video recorder (DVR), or a device for playing media supplied from a portable storage device. In addition, the media unit 24 of the entertainment system 22 may include a plurality of control buttons 30 (e.g. power button, screen mode button, stop, pause, play, fast forward, rewind, and a source button) for controlling the operation of the entertainment system 22 mounted within the replacement headrest 20.

Moreover, the display 26 of the entertainment system 22 may be, for example, a liquid crystal display (LCD) screen, an organic light emitting diode (LED) or electro-luminescent display. Examples of vehicle headrests which may be used in accordance with the vehicle headrest covers 10 of embodiments of the present invention, include but are not limited to those vehicle headrests described in U.S. application Ser. No. 11/593,380, filed on Nov. 6, 2006 entitled ENTERTAINMENT SYSTEM MOUNTABLE IN A VEHICLE SEAT, commonly owned and assigned with the instant application, which is hereby incorporated by reference herein in its entirety.

As mentioned above, the headrest cover 10 of the present embodiment may be used to cover the replacement vehicle headrest 20 having the entertainment system mounted therein to modify or alter the appearance (e.g. the color and/or texture) of the vehicle headrest 20 to, for example, closely match the appearance (e.g. color and/or texture) of the interior of the vehicle or at the very least complement a shade of the interior of the vehicle in which the headrest and cover are installed. To closely match the appearance of the interior of the vehicle or at least complement a shade of the interior of the vehicle, the headrest cover 10 of embodiments of the present invention may be provided in a variety of different colors and variety of different textures or materials. For example, the headrest cover 10 may be provided in, but is not limited to colors, such as black, tan or grey and also can include textures and materials such as vinyl, leather, cloth or nylon. The consumer would choose a headrest cover in a particular color and composed of a particular texture and material based upon, for example, the color, texture and material of the interior of the vehicle.

It is noted that, based upon the way vehicles are typically designed, when a headrest cover of embodiments of the present invention modifies a vehicle replacement headrest to complement a shade of the interior of a vehicle, a shade of the exterior of that same vehicle will likely be complemented by that particular headrest cover as well. In other words, the shades of the interior and exterior areas of a vehicle generally complement each other, so that if you complement a shade one of you will more than likely also complement the shade of the other.

The headrest covers 10 of embodiments of the present invention are custom designed, for example, according to the shape and dimensions of the vehicle replacement headrest 20 having the entertainment system 22 with display 26 mounted therein, such that the headrest cover 10 provides a snug fit over substantially the entire replacement headrest 20, including around the upper portion of the support rods 36 of the headrest 20. The headrest covers 10 may be customed designed according to the shape and dimensions of the replacement headrest 20 by, for example, cutting, sewing and shaping a desired material, such as, e.g., vinyl, leather, cloth or nylon to form the headrest cover 10. Alternatively, the headrest covers 10 may include an elastic material capable of stretching to multiple sizes so as to fit over different sized headrests and still maintain a snug fit.

In some embodiments of the present invention, the headrest cover 10 is designed to very closely approximate the shape and dimensions of the vehicle replacement headrest 20. In addition, in these embodiments, the color and texture of the headrest cover 10 also closely matches the color and texture of the interior of the vehicle in which the replacement headrest 20 and headrest cover 10 are to be installed. As a result, when the headrest cover 10 is affixed over the replacement headrest 20, the cover 10 looks as though it is part of the vehicle headrest 20, rather than appearing as a separate cover. For example, by way of illustration, in some embodiments, one may install a tan vinyl cover closely corresponding to the shape and dimensions of a replacement headrest installed in a vehicle having a tan colored interior with vinyl seating, such that when the headrest cover is placed over the replacement headrest, the headrest cover looks as though it were part of the replacement headrest 20 and not separate therefrom.

It is noted that it may be easier to more closely approximate the dimensions of a replacement headrest 20 using material such as vinyl, leather and to some extent cloth (depending upon the thickness of the cloth) than to closely approximate the dimensions of the replacement headrest 20 using materials such as nylon. When the dimensions of the vehicle headrest cover 10 do not closely approximate the dimensions of the vehicle replacement headrest 20, a shifting of the headrest cover 10 may occur after being placed over the replacement headrest 20. This shifting of the vehicle headrest cover 10 may result in the headrest cover 10 obstructing the view of the display screen 26 of the entertainment system 22 mounted within the replacement headrest 20 and/or obstructing the users access to the control buttons 30 of the entertainment system 22. Consequently, headrest covers 10 made of nylon and certain thicknesses of cloth materials (e.g. thinner cloth materials) may be more prone to shifting when placed over a replacement headrest 20 than leather or vinyl headrest covers. Thus, when using material which may be more prone to shifting such as for example, nylon, an additional item such as a trim bezel frame 38 may be required to prevent the nylon cover from shifting. The trim bezel frame 38 will be described in further detail herein. It is to be understood that the trim bezel frame 38 is also usable with the headrest covers 10 having materials other than nylon, such as the leather or vinyl covers.

Further, as mentioned above and as illustrated in FIG. 1, the headrest cover 10 of the current embodiment also includes an opening 32 in the bottom of the cover 10 which leads to a cavity 34 in the interior of the headrest cover 10 which accommodates the replacement headrest 20 therein. In some embodiments, once the headrest cover 10 is placed over the replacement headrest 20, the headrest cover 10 can be kept even more tightly in place around the replacement headrest 20 by providing fasteners as part of the headrest cover. These fasteners may be any type of fastener known in the art which may keep the vehicle headrest cover 20 even further tightly and securely in place around the vehicle replacement headrest 20.

The fasteners may include, for example, VELCRO®, snaps, plastic fasteners, hidden zippers. For example, VELCRO® strips or plastic fasteners could be disposed on the bottom of the headrest cover 10 and could be joined/connected together underneath the headrest near where the support rods 36 of the replacement headrest 20 are located to thereby even more firmly hold the headrest cover in place over the replacement headrest 20. The fasteners provided with the headrest cover 10 are preferably hidden or at least partially hidden from view when the headrest cover 10 is placed over the replacement headrest 20. In some embodiments, rather than using fasteners, the headrest cover 10 could instead be constructed of an elastic material (e.g. an elastic nylon material) which may be stretched over the headrest and released to a zero memory position such that it clings and firmly stays in place.

Additionally, as mentioned above and as illustrated in FIG. 1, the headrest cover 10 further includes a cut out 28 in the front face thereof which corresponds to the position of the display screen 26 and control buttons 30 of the entertainment system 22 mounted within the replacement headrest 20, thereby allowing the user to view the display screen 26 of the entertainment system 22 mounted within the headrest 20 through the headrest cover 10 and also allowing the user to have access to the control buttons 30 of the entertainment system 22 through the headrest cover 10 as well. Consequently, the headrest cover 10 is designed so as not to hinder the viewing or operation of the video entertainment system 22 of the replacement headrest 20. Also, additional cut outs 25, 27 and 29 may be provided in the cover 10, e.g. on the side of the cover 10 for allowing access to additional slots, ports and jacks associated with the entertainment system 22 mounted in the replacement headrest 20.

Also, as discussed above and as illustrated in FIGS. 3A, 3B, 4A and 4B, a trim bezel frame 38 formed of, for example, plastic or metal material may further be provided for use with the headrest cover 10 of embodiments of the present invention for preventing the headrest cover 10 from shifting to obstruct the user's view of the display screen 26 mounted within the replacement headrest 20 and/or to obstruct the user's access to the control buttons 30 of the entertainment system 22. Thus, in some embodiments of the invention, the trim bezel frame 38 is used in conjunction with headrest covers 10 made of nylon and cloth of thinner thicknesses because, as discussed, headrest covers made of these materials can be more prone to shifting when placed over a replacement headrest 20 than headrest covers made of vinyl, leather or cloth of thicker thicknesses.

In addition to being utilized to prevent the shifting of the headrest cover 10 as described above, the trim bezel frame 38 may also be used to provide a more decorative look for the display screen 26 of the entertainment system 22 mounted within the replacement headrest 20. Therefore, the trim bezel frame 38 may be used with any of the headrest covers 10 of embodiments of the present invention made of vinyl, leather, nylon or cloth (thinner or thicker) for preventing shifting and providing a more decorative look for the display screen 26 of the entertainment system 22 mounted within the replacement headrest 20. In this regard, the trim bezel frame 38 may also be provided in various colors and designs so as to, for example, closely match or at least complement a shade of the particular headrest cover and the interior of various vehicles.

Figure 3A:
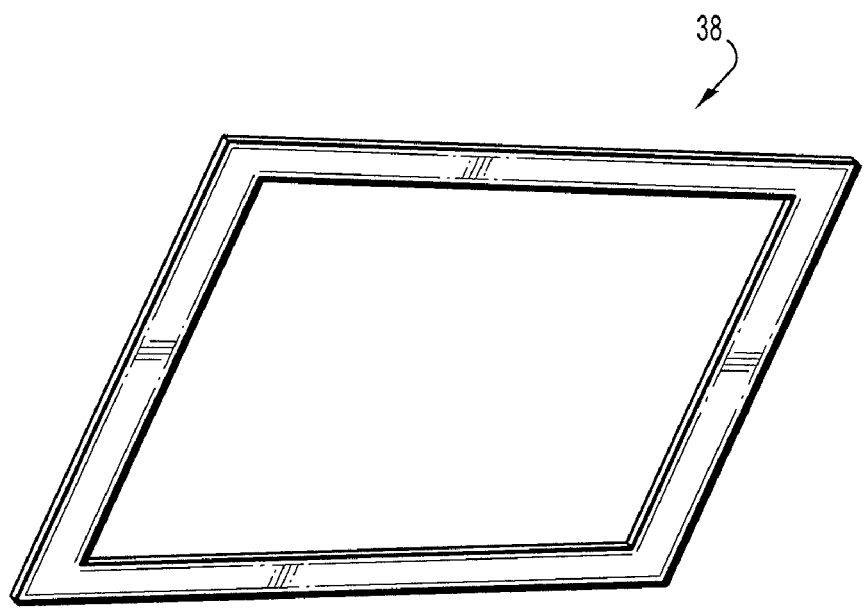
FIG. 3A illustrates a removable trim bezel frame which may be used in accordance with an embodiment of the present invention.
Figure 3B:
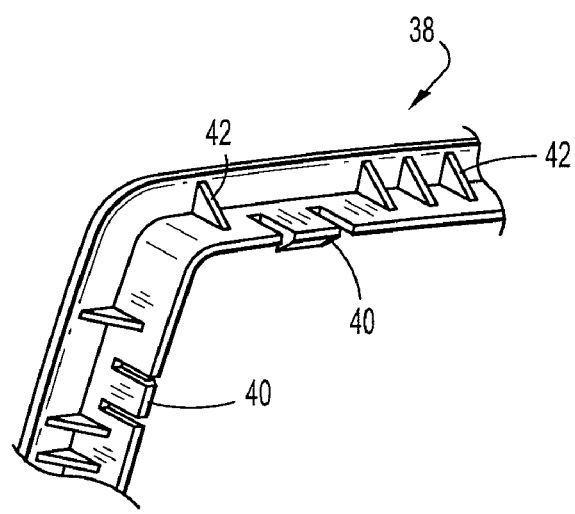
FIG. 3B illustrates a partial view of a bottom surface of the trim bezel of FIG. 3A.
Figure 4A:
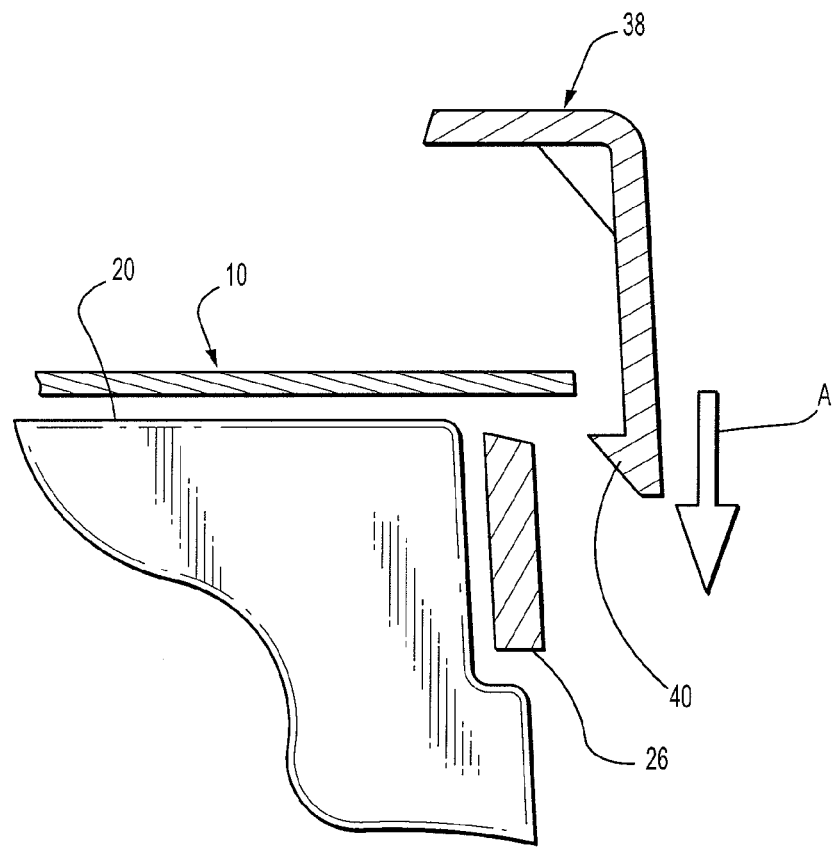
FIG. 4A illustrates a side cross-sectional view of a vehicle headrest cover in accordance with an embodiment of the present invention fitted over a vehicle headrest wherein a trim bezel is in the process of being moved into position to be attached around a display of an entertainment system of the vehicle headrest.
Figure 4B:
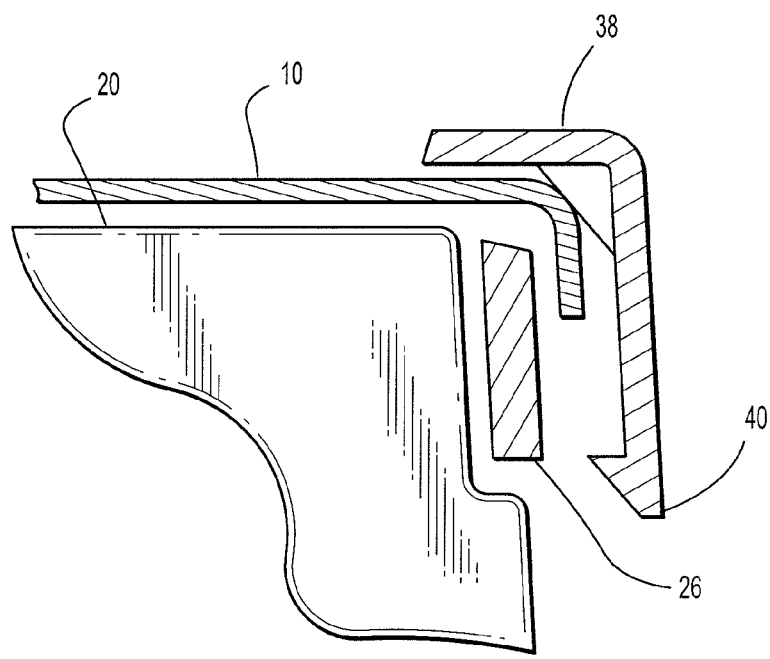
FIG. 4B illustrates a side cross-sectional view of the vehicle headrest cover of FIG. 4A affixed over the headrest and also depicts the trim bezel attached both around the display of the entertainment system of the vehicle headrest and attached to a portion of the headrest cover.

The trim bezel frame 38 may be attached around the display screen 26 (e.g. around the sides of the display screen 26)

of the entertainment system 22 mounted in the replacement headrest 20 after the headrest cover has already been fitted over the replacement headrest. In the current embodiment, the trim bezel frame 38 is attached around the display screen 26 by manipulating snap-fit mechanisms as explained in further detail below. For example, as shown in FIGS. 3B, 4A and 4B, the trim bezel frame 38 includes a plurality of tabs 40 located on the bottom surface thereof which snap fit into corresponding recesses or receptacles around the display screen 26 such that the trim bezel frame 38 attaches around the display screen 26. Moreover, as shown in FIGS. 3B, 4A and 4B, the trim bezel frame 38 also includes a plurality of teeth or spikes 42 disposed on a surface(s) thereof (e.g. around a perimeter portion of the frame 38), which may attach (e.g. by piercing or gripping) to a portion of the material of the headrest cover 10 disposed adjacent to the entertainment system 22 mounted in the replacement headrest 20 when the trim bezel frame 38 is attached around the display screen 26. As discussed, the attachment of the trim bezel frame 38 around the display screen 26 and to a portion of the vehicle headrest cover 10 may prevent the headrest cover 10 from shifting to obstruct the users' view of the display screen 26 and/or hinder the user's operating the entertainment system 22 via the control buttons 30.

By way of illustration, FIG. 4A, is a side cross-sectional view which shows (see arrow A) the trim bezel being moved toward attachment around the display screen 26 of the entertainment system 22 mounted within the replacement headrest 20 after the headrest cover 10 has already been placed over the replacement headrest 20. In addition, by way of illustration, FIG. 4B is a side cross-sectional view which illustrates the headrest cover 10 already affixed over the replacement headrest 20, with the trim bezel 38 being attached around the display screen 26 mounted within the replacement headrest 20 and attached to a portion of the headrest cover 10.

Also, in some embodiments, the headrest covers 10 may be imprinted with different designs thereon. For example, the headrest covers 10 could be imprinted with a logo of the customer's preference such as, a college logo, favorite team, etc.

In other embodiments, the headrest covers may be stain resistant.

Further, in some embodiments of the present invention, the headrest covers 10 may be packaged and sold separately from the replacement headrest 20 having an entertainment system 22 with display 26 mounted therein. In other embodiments, the headrest cover 10 and the replacement headrest 20 may each be packaged and sold together. In other embodiments, the headrest cover 10, replacement headrest 20 and trim bezel frame 38 may each be packaged and sold together. Further, in some embodiments, only the headrest cover 10 and the trim bezel frame 38 are packaged and sold together.

Also, in other embodiments, multiple headrest covers (e.g. two or more headrest covers) made of different colors and/or different materials may be packaged and sold together to give the consumer a wider variety of choices and the ability to replace one headrest cover with another when desired. For example, in some embodiments, a black vinyl headrest cover, a tan vinyl headrest and a grey vinyl headrest may all be sold together in one package. In other embodiments, for example, a black leather headrest cover and a tan leather headrest cover may be sold together in one package. In other embodiments, for example, a black cloth headrest cover, a tan cloth headrest cover and a grey cloth headrest cover may be sold together in one package. In yet other embodiments, a black nylon headrest cover, tan nylon headrest cover and a grey nylon headrest cover may be sold together in one package.

In still other embodiments, the multiple headrest covers may also be packaged and sold together with the replacement headrest and/or trim bezel frame. For example, in an embodiment, a black nylon headrest cover, a tan nylon headrest cover, a grey nylon headrest cover and at least one trim bezel frame are all sold together in one package.

Furthermore, as discussed above, the headrest cover 10 of embodiments of the present invention may be used in conjunction with various types of replacement headrests having an entertainment system with display mounted therein. For example, one type of replacement headrest in which the cover may be used with is a replacement headrest adaptable to fit in multiple vehicles. This universal replacement headrest includes a wheel located on the underside of the headrest which allows the user to ratchet the headrest posts (which insert into the vehicle back seat) either farther apart or closer together, by inserting a small removable tool into the wheel and turning it either forward or backward. In addition, this replacement headrest may also be provided with different diameter posts sleeves (e.g. made of metal and chrome finish) which allow the user to change the diameter of the permanent posts of the replacement headrest when necessary simply by sliding the sleeves over the existing permanent headrest posts to convert the headrest posts to the proper diameter required by a particular vehicle.

Figure 5:
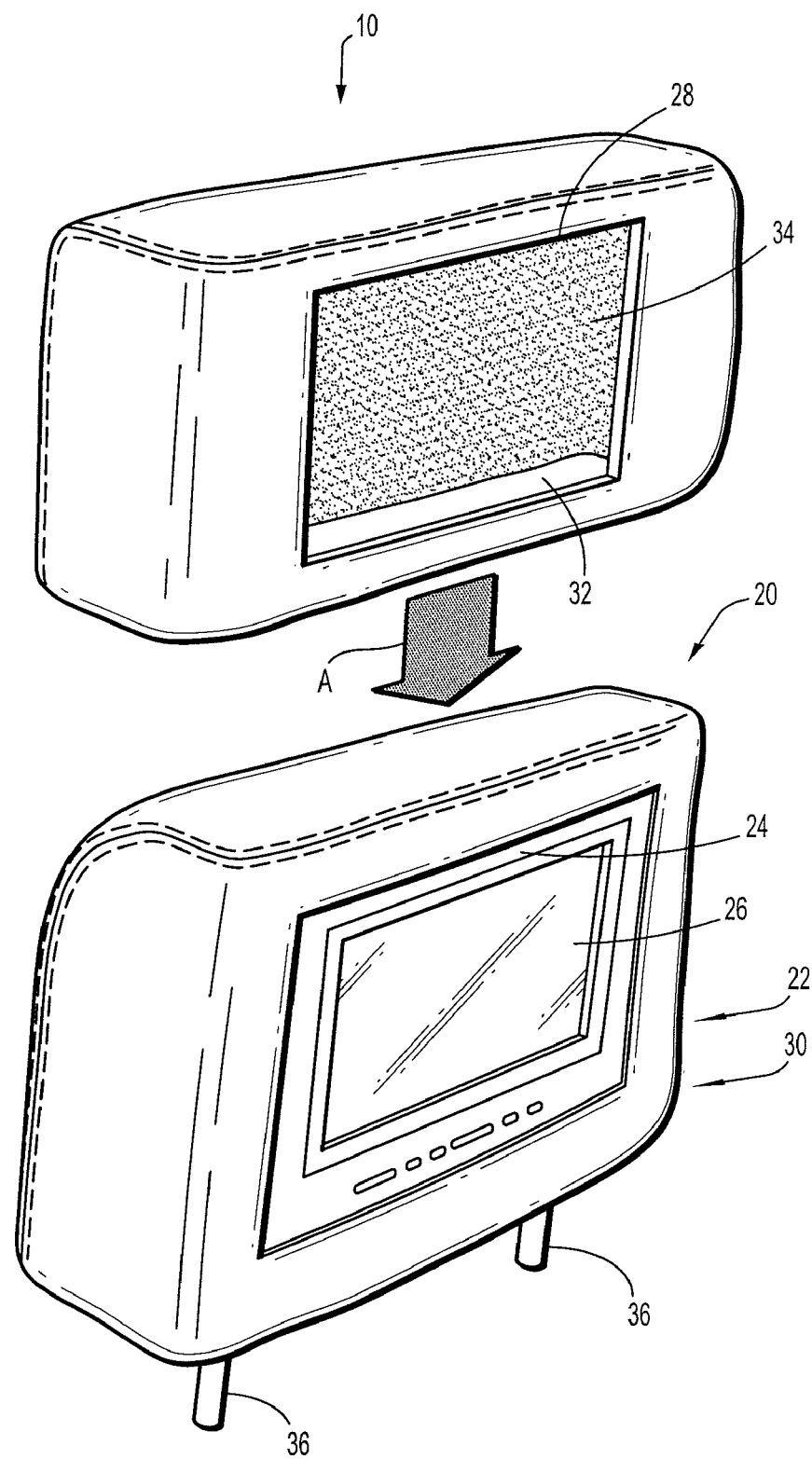
FIG. 5 illustrates a method of installing a vehicle headrest cover according to an embodiment of the present invention.

A method for using the vehicle headrest cover 10 in accordance with an embodiment of the present invention will be described below with reference to FIG. 5, by way of example only. In this example, the interior of the vehicle in which the vehicle replacement headrest 20 and vehicle headrest cover 10 are installed is a tan interior with vinyl seats. The method of this embodiment described below and illustrated in FIG. 5 is to closely match the interior appearance of this vehicle with the headrest cover 10.

First, a user would have an original headrest of a particular vehicle replaced with a replacement headrest 20 having an entertainment system (e.g. DVD player) and display screen mounted therein. Next, as shown in FIG. 5, after the vehicle replacement headrest 20 has already been installed within the vehicle, the user would then install a tan vinyl vehicle headrest cover 10 over the vehicle replacement headrest 20 by sliding (as indicated by arrow A in FIG. 5) the headrest cover 10 over the replacement headrest 20 through the opening 32 in the headrest cover and into the cavity 34 of the headrest cover to thereby modify the appearance of the vehicle replacement headrest 20 to closely match the tan colored interior of the vehicle and the vinyl material of the seats of the vehicle. Then, if desired, the user could then adjust the headrest cover 10 via fasteners (e.g., Velcro®, snaps, plastic fasteners, or hidden zippers) if these fasteners are provided with the headrest cover 10 for further firmly securing the headrest cover 10 over the replacement headrest 20. Lastly, if desired, the user could then remove the headrest cover 10 by, for example, undoing the fasteners (if used) and then pulling the headrest cover 10 off of the replacement headrest 20 and either replacing this headrest cover with a different headrest cover (e.g. a different color headrest cover) or just simply removing this headrest cover 10 from the vehicle.

Next, a method for using the headrest cover 10 in accordance with an embodiment of the present invention will be described below with reference to FIG. 6, by way of example only. In this example, the interior of the vehicle in which the replacement headrest 20 and headrest cover 10 are installed is a taupe colored interior with cloth seats. The method of this exemplary embodiment described below and illustrated in FIG. 6 is to complement a shade of the interior of the vehicle with the headrest cover 10.

First, a user would have an original headrest of a particular vehicle replaced with a replacement headrest 20 having an entertainment system 22 (e.g. DVD player) and display screen 26 mounted therein. Next, as shown in FIG. 6, after the vehicle replacement headrest 20 has already been installed within the vehicle, the user would then install a tan elastic nylon headrest cover 10 over the replacement headrest 20 by sliding the headrest cover 10 (as indicated by arrow A in FIG. 6) over the replacement headrest 20 through the opening 32 in the vehicle headrest cover 10 and into the passageway 34 of the headrest cover 10 to thereby complement the shade of the taupe colored interior of the vehicle.

Figure 6:
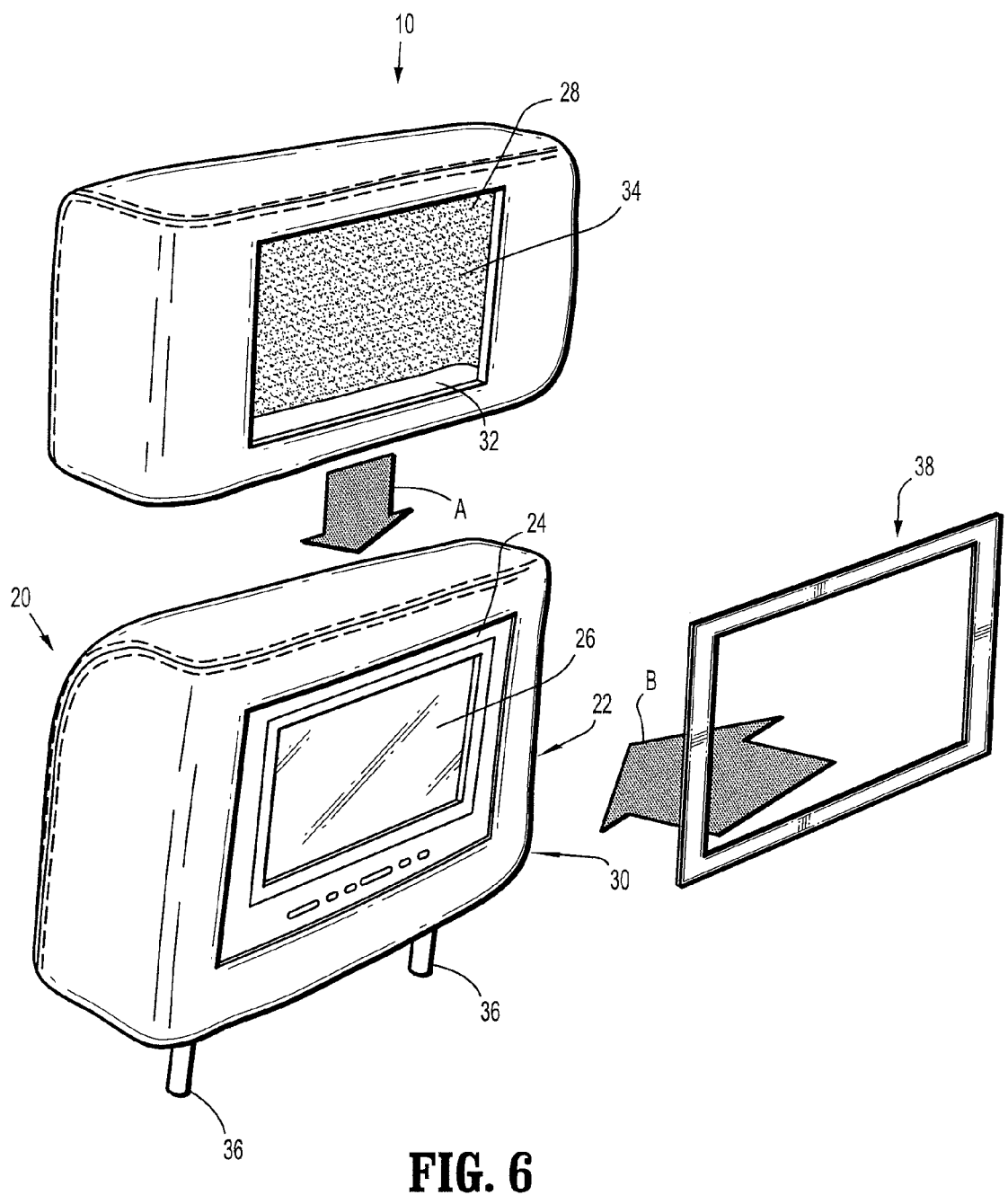
FIG. 6 illustrates a method of installing a vehicle headrest cover according to an embodiment of the present invention.

Subsequently, after the headrest cover 10 has been placed over the replacement headrest 20, a trim bezel frame 38, as shown in FIG. 6 may be attached around the display screen 26 of the entertainment system 22 mounted within the replacement headrest 20, if desired, for preventing the headrest cover 10 from shifting to obstruct the viewing of the display screen 26 and/or interfering with the operation of the entertainment system 22 mounted in the replacement headrest. In this embodiment, the trim bezel frame 38 is attached around the display screen 26 via the plurality of tabs 40 (see FIG. 3B) located on a surface of the trim bezel frame 38 which snap into corresponding recesses or receptacles located around the display screen 26. Moreover, the plurality of teeth or spikes 42 (See FIG. 3B) provided on a surface of the trim bezel 38 pierce a portion of the material of the headrest cover for preventing the headrest cover 10 from shifting. The trim bezel frame 38 is used with the headrest cover 10 of this embodiment because, as discussed above, nylon headrest covers may be more prone to shifting than headrest covers made of vinyl, leather and thicker cloth materials.

Lastly, if desired, the user could then remove the headrest cover 10 by, for example, detaching the trim bezel 38 from around the display screen 26 and then pulling the headrest cover 10 off of the replacement headrest 20. The user could then either replace this headrest cover 10 with a different headrest cover (e.g. a headrest cover in a different color) or just simply remove this headrest cover 10 from the vehicle.

Figure 8:
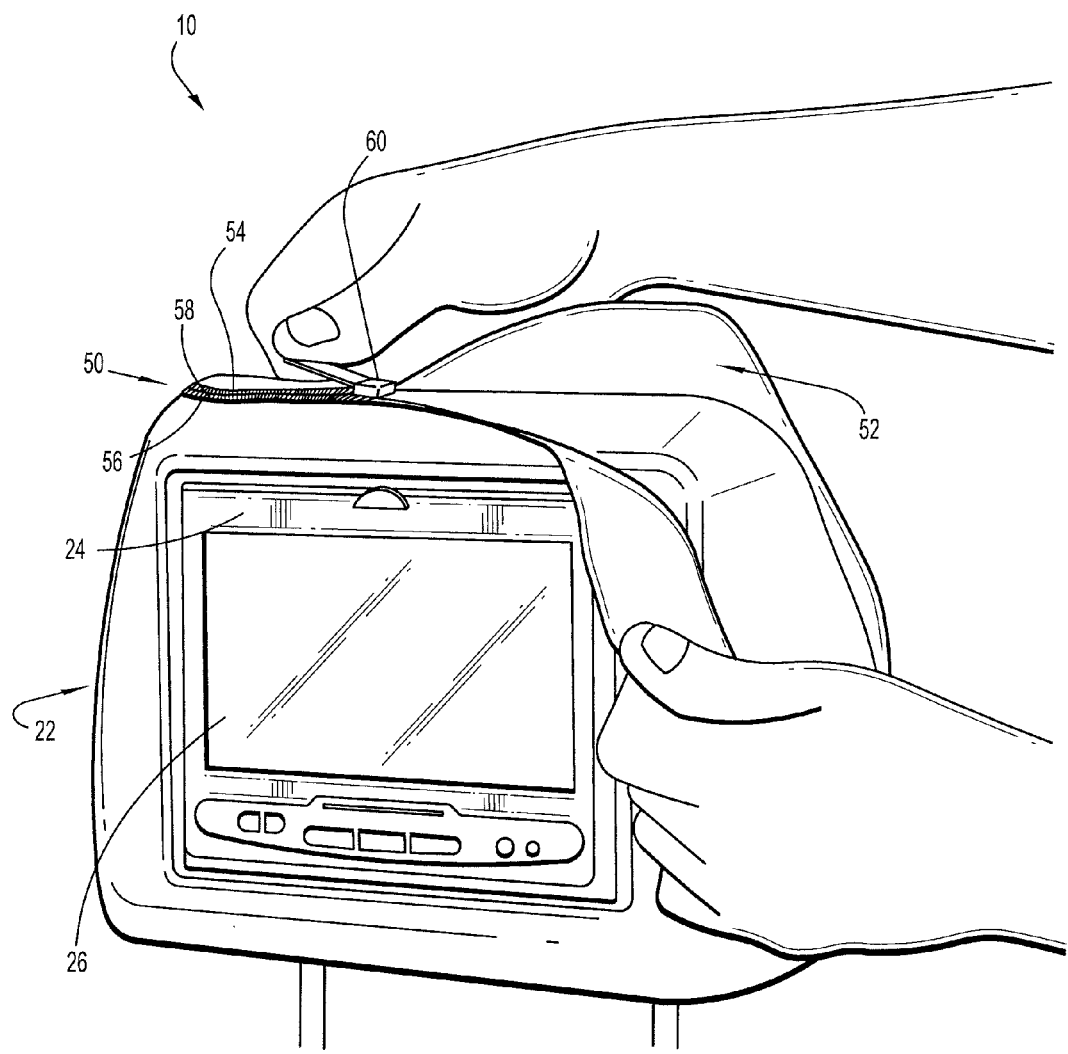
FIG. 8 illustrates a vehicle headrest cover which includes a zipper mechanism according to an embodiment of the present invention.

In still other embodiments of the present invention, as shown in FIG. 8, the vehicle headrest cover 10 may be equipped with a zipper mechanism or zipper 50 therewith for fastening or binding the adjacent edges of an opening 52 in the headrest cover 10. The zipper 50 may include, for example, two strips or facing rows 54, 56 of material with metal or plastic teeth 58 along the edges, and a sliding piece or tab 60 that interlocks the teeth 58 when moved in one direction and separates them again when moved in the opposite direction. The zipper 50 allows a user to securely mount the vehicle headrest cover 10 on the vehicle headrest 20 by placing the headrest cover 10 over the vehicle headrest 20 through an opening 52 in the unzipped headrest cover and then zipping up the zipper 50 to close the opening 52, thereby securely mounting the headrest cover 10 in place on the vehicle headrest 20. In addition, the zipper 50 on the headrest cover 10 also allows a user to remove/replace the headrest cover 10 mounted on the vehicle headrest by unzipping the zipper 50 and then removing the headrest cover 10 from the vehicle headrest 20. Moreover, the zipper or zipper mechanism may also be hidden or partially hidden from view. Also, any zipper or zipper mechanism known in the art may be used in accordance with the headrest cover of the present embodiment.

Figure 7:
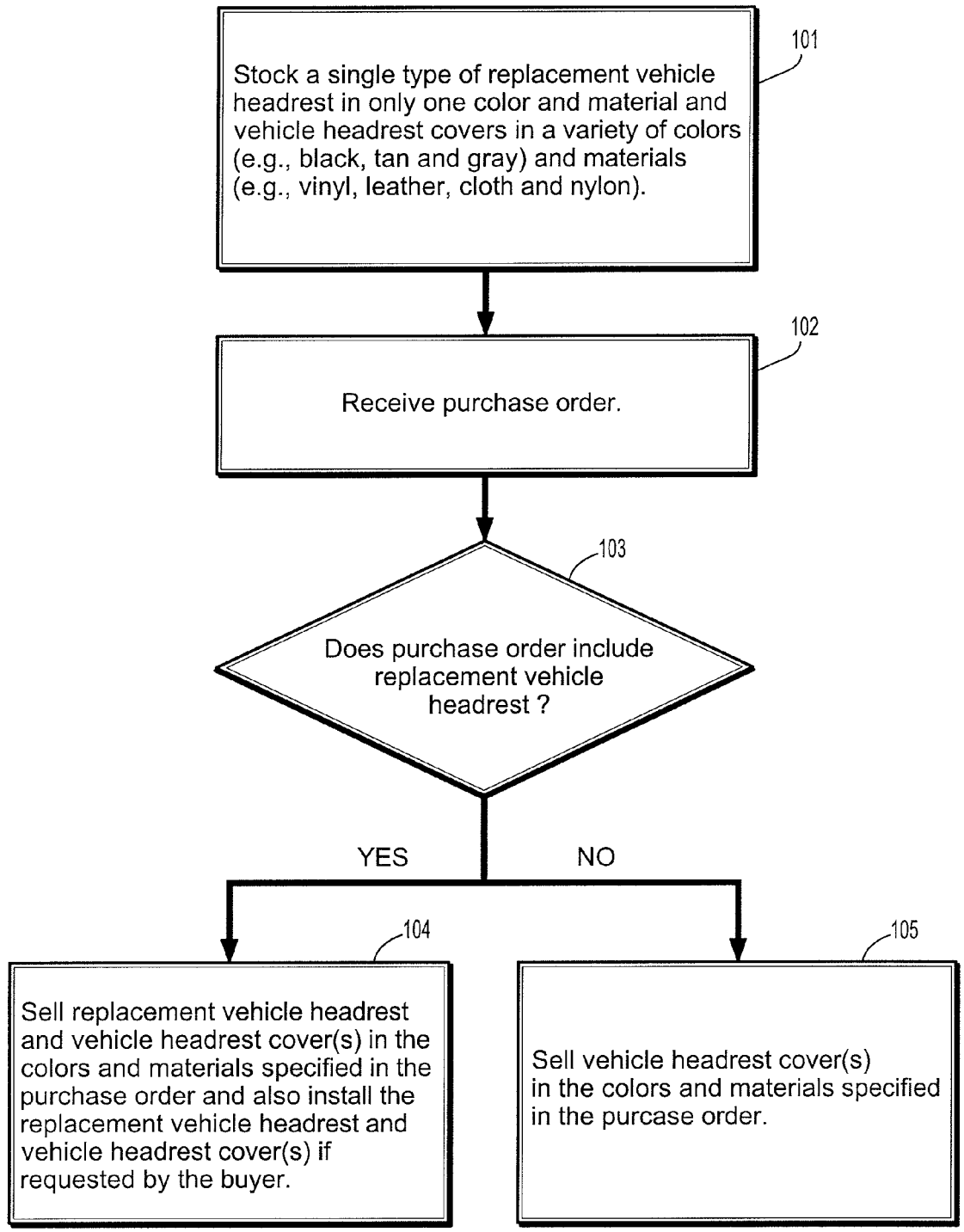
FIG. 7 is a flow chart of a method of distribution of vehicle headrest covers and replacement headrests according to an embodiment of the present invention.

FIG. 7 illustrates a method of stocking vehicle replacement headrests 20 having entertainment systems with displays mounted therein and a variety of different headrest covers for use therewith according to an exemplary embodiment of the present invention. This method described in FIG. 7 is by way of example only and is no way meant to limit the scope of exemplary embodiments of the present invention. Referring to FIG. 7, a seller will stock (i) a single type of replacement headrest having an entertainment system and display mounted therein in only one color and material (e.g. a black vinyl replacement headrest) and also stock (ii) headrest covers in a variety of different colors (e.g. black, tan or grey) and materials (e.g. vinyl, leather, cloth, or nylon) for use therewith 101.

Upon receiving a purchase order 102 from a prospective buyer, the seller determines whether or not the vehicle replacement headrest is included 103 in the order. If the purchase order includes the replacement headrest, the seller then sells to the buyer the vehicle replacement headrest and one or more headrest covers for use therewith in the colors and materials specified in the purchase order and may also install the replacement headrest in the vehicle for the buyer if requested 104. For orders which do not include the replacement headrest (e.g. in situations where the buyer already owns the replacement headrest), the seller simply sells one or more vehicle headrest covers to the buyer in the colors and materials specified in the purchase order 105. Consequently, by stocking a variety of vehicle headrest covers of differing colors and materials, the seller or manufacturer need only stock a single type of replacement vehicle headrest and still be able to at least complement a shade of the interior of variety of different vehicles.

The above stocking method depicted in FIG. 7 may further include stocking trim bezel frames which may be sold together with the replacement headrest and with one or more vehicle headrest covers. Alternatively, the trim bezel frames may be sold separately with only one or more vehicle headrest covers.

In sum, a purchaser may choose to purchase a particular headrest cover of embodiments of the present invention based upon the appearance of the interior, (e.g. color and texture of the material of the interior) of his or her vehicle. While not guaranteed to exactly match a vehicle's interior, the headrest covers of embodiments of the present invention will at least complement a shade of the interior of the vehicle. The consumer may also, if desired, decide to include a trim bezel frame for the headrest cover with their order, if the material of cover so dictates (e.g. material prone to shifting) or to provide a more decorative effect for the replacement headrest.

Consequently, the headrest cover, in accordance with embodiments of the present invention, provides at least the following benefits set forth below. For one, the headrest covers allow a manufacturer to stock only one type of replacement headrest for sale which can be used in a variety of different vehicles instead of stocking several replacement headrests of differing colors and textures, thereby significantly reducing manufacturing and overhead costs. In addition, the headrest covers also allow users or customers to change the appearance of a headrest in their vehicle at a relatively low cost compared with having to having to purchase an entirely new headrest which is custom made by the manufacturer. Moreover, the headrest covers are relatively simple to install and thus the user or customer should be able to install these vehicle headrest covers into their vehicle without any assistance from a professional.

Having described the exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A vehicle headrest cover package for a vehicle headrest having a display mounted therein, the package comprising:
   at least one vehicle headrest cover comprising a material designed to correspond to a shape and dimensions of the vehicle headrest and to fit over the vehicle headrest, the material having an opening in a bottom surface thereof to receive the vehicle headrest therethrough, the material having a cut-out in a front face thereof which corresponds to a position of the display;
   a zipper mechanism located on the material of the headrest cover which allows the material of the vehicle headrest cover to be zipped up to cover the vehicle headrest with the vehicle headrest cover or unzipped for removing the headrest cover from the vehicle headrest; and
   at least one trim frame for attaching around the display and which is selectively removable therefrom,
   wherein the at least one trim frame includes a plurality of tabs disposed on a surface of the trim frame, the plurality of tabs snap fit into corresponding recesses around the display for attaching the at least one trim frame around the display and a plurality of teeth disposed on a surface of the trim frame for attaching to a portion of the material of the headrest cover when the trim frame is attached around the display, and wherein the plurality of teeth pierce the portion of the material of the vehicle headrest cover when the trim frame is attached around the display.

2. The vehicle headrest cover package of claim 1, wherein each of the plurality of teeth of the at least one trim frame have a wedge shape and wherein the plurality of teeth and the plurality of tabs are each located on a bottom surface of the at least one trim frame.

3. The vehicle headrest cover package of claim 1, wherein the at least one trim frame closely matches or at least complements a shade of the vehicle headrest cover and an interior of a particular vehicle.

4. The vehicle headrest cover of claim 1, wherein the material further comprises one or more additional cut outs located in a side of the material which correspond to at least one of a slot, a port and a jack located separate from the display and located in a top surface of the material which correspond to at least one of a slot, a port and a jack located separate from the display.

5. The vehicle headrest cover package of claim 1, wherein the material is one of nylon or cloth.

6. The vehicle headrest cover package of claim 1, wherein the material is one of vinyl or leather.

7. The vehicle headrest cover package of claim 1, wherein the at least one trim frame is formed of a material comprising one of a metal or plastic.

8. A method for installing a vehicle headrest cover on a vehicle headrest, comprising:
   unzipping a zipper mechanism located on a vehicle headrest cover, the vehicle headrest cover formed of a material designed to correspond approximately with a shape and dimensions of the vehicle headrest and snugly fit over the vehicle headrest for covering the vehicle headrest, the material having a cut-out in a face thereof which corresponds to a position of a display mounted in the vehicle headrest;
   placing the unzipped headrest cover over a vehicle headrest through an opening in the unzipped material of the vehicle headrest cover;
   zipping up the zipper mechanism on the vehicle headrest cover to close the opening in the headrest cover; and
   attaching a trim frame around the display by snapping a plurality of tabs located on a surface of the trim frame into corresponding recesses around the display and piercing the material of the vehicle headrest cover with a plurality of teeth disposed on a surface of the trim frame.

9. The method of claim 8, wherein each of the plurality of teeth of the at least one trim frame have a wedge shape and wherein the plurality of teeth and the plurality of tabs are each located on a bottom surface of the at least one trim frame.

10. The method of claim 8, wherein the at least one trim frame closely matches or at least complements a shade of the vehicle headrest cover and an interior of a particular vehicle.

11. The method of claim 8, wherein the material further comprises one or more additional cut-outs located in a side of the material which correspond to at least one of a slot, a port and a jack located separate from the display and located in a top surface of the material which correspond to at least one of a slot, a port and a jack located separate from the display.

12. The method of claim 8, wherein the at least one trim frame closely matches or at least complements a shade of the vehicle headrest cover and an interior of a particular vehicle.

13. The method of claim 8, wherein the material is one of nylon or cloth.

14. The method of claim 8, wherein the material is one of vinyl or leather.

15. The method of claim 8, wherein the vehicle headrest is a replacement vehicle headrest which is installed into a vehicle to replace an original vehicle headrest.

16. The method of claim 8, wherein the at least one trim frame is formed of a material comprising one of a metal or plastic.

* * * * *